2,940,955
OLEFIN COPOLYMER

Edward C. Shokal, Walnut Creek, and Paul A. Devlin, Orinda, Calif., assignors to Shell Oil Company, a corporation of Delaware No Drawing. Filed Oct. 15, 1956, Ser. No. 615,751

3 Claims. (Cl. 260—73)

This invention relates to novel copolymers. More particularly, it relates to novel copolymers obtained from the reaction of an alpha, beta-unsaturated aldehyde and a long chain olefin, and to hydrogenated derivatives thereof.

Numerous resinous products are known which are prepared from unsaturated monomers. Such products have a variety of uses depending upon their physical and chemical characteristics. Indeed, resins are known which are prepared from aldehydes and olefins but such products may be distinguished from related polymers prepared from other aldehydes and other olefins by the ultimate characteristics which the polymer exhibits. Thus, for example, it has been found that useful industrial applications of many resins may be obtained if the resin is soluble in oil.

It is an object of this invention to prepare novel aldehyde-olefin copolymers which are soluble in oil. It is another object of this invention to prepare novel copolymers which will be inexpensive and simple to prepare. It is a further object of this invention to prepare novel aldehyde-olefin copolymers which may be used as valuable starting materials for polyester resins. Other objects will become apparent as the description proceeds.

According to the present invention, novel copolymers are prepared from an alpha, beta-unsaturated aldehyde and a long chain mono-olefin having at least 8 carbon atoms. The product thus obtained, containing a plurality of carbonyl groups, may be hydrogenated to produce a polymeric polyhydric alcohol of the reaction product of the alpha, beta-unsaturated aldehyde and the mono-olefin having at least 8 carbon atoms.

Preferably, the copolymers of this invention are obtained from an aldehyde and a mono-olefin having from 8 to 20 carbon atoms. Such olefins include octenes, decenes, hexadecenes, tetradecenes, nonadecenes and the like. Particularly preferred are the olefins having from 12 to 18 carbon atoms as such olefins present preferred solubility characteristics in various oils.

The aldehydic portion of the copolymer is derived from alpha,-beta-unsaturated aldehydes, i.e., aldehydes having an ethylenic group between two carbon atoms one of which is attached to the aldehyde group

It may be straight chain or cyclic in character, and may or may not contain one or more aromatic constituents. The most desirable aldehydes for the purpose of the present invention have a terminal methylene group attached directly by a double bond to a carbon atom which in turn is attached directly to an aldehyde group as represented by the formula

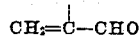

In general, aldehydes having not more than 10 carbon atoms in the molecule are preferred. Examples of suitable alpha, beta-unsaturated aldehydes are acrolein, alpha-n-butyl acrolein, alpha-n-amyl acrolein, alpha-n-hexyl acrolein, alpha, beta-dimethyl acrolein, furfural, cinnamic aldehyde, and the like.

The copolymerization of the alpha, beta-unsaturated aldehyde and the mono-olefin is effected by heating a liquid mixture of the two compounds at about 50° C. to 200° C. and preferably at about 80° C. to 150° C. It is most convenient that the reaction be conducted at the reflux temperature, at normal pressure, of the liquid mixture as temperature control is facilitated without excessive polymerization of the individual monomers. It is particularly desirable that steps be taken to avoid polymerization of either monomer by itself. One method of accomplishing this is to charge into the reaction vessel a sufficient excess of one of the reactants which has been stabilized against autopolymerization. Thus, for example, the olefin may be charged to the reaction vessel followed by the addition, in increments, of the alpha, beta-unsaturated aldehyde which has added thereto small amounts of a stabilizer. An example of this procedure involves the use of hydroquinone to stabilize acrolein.

The copolymerization occurs, upon the application of heat, in either the presence or absence of a peroxy polymerization catalyst. Such peroxy catalysts which may be included, are for example, benzoyl peroxide, acetyl peroxide, ditertiary-butyl peroxide, tertiary-butyl hydroperoxide, and the like. The catalyst may be present in amounts ranging from 0.2 to 5% by weight but preferably it ranges from about .5 to 3% by weight of the total mixture.

As indicated above, the aldehyde may have a tendency to polymerize by itself. Therefore, it is desirable that large excesses of the aldehyde, particularly in the case of the acroleins, be avoided yet at the same time, it is desirable that there be an excess of the olefin throughout the reaction. The molar ratio of the olefin to the aldehyde may initially range from about slightly more than 1:1 to about 20:1. Preferably, however, it should range from about 2:1 to about 10:1. As the aldehyde is consumed, more is added in increments to maintain the desired ratio throughout the reaction.

The copolymer of the alpha, beta-unsaturated aldehyde and the olefin normally contains a greater proportion of the olefin in the final product than is present in the monomer mixture. Thus, a monomer mixture containing a weight ratio of olefin to the aldehyde of about 50:50 will result in a copolymer containing from about 5 to 30 weight percent of carbonyl units in the copolymer. Therefore, at the conclusion of the reaction, there will be present a considerable amount of unreacted olefin together with some aldehyde. These unreacted monomers may be removed from the reaction mixture by distillation whereupon the products of this invention are recovered.

The molecular weight of the olefin-aldehyde reaction product will vary depending on a number of factors. Among such factors are the specific reactants involved, their proportions, and the conditions of reaction. Of considerable importance are the time and temperature of the reaction. As a practical matter it is found that the reaction mass may not be subjected to high reaction temperatures for excessive periods of time as the aldehyde will begin to polymerize by itself. The result is that the final product will contain considerable quantities of the polymerized aldehydes, which in many cases are insoluble in oils. It is found that reaction times of about five hours at the maximum temperature previously described will produce copolymers having desirable solubility characteristics in oil and having molecular weights ranging from about 500 to about 3000 as determined by ebullioscoping in toluene. A molecular weight of about 1000 to 2000 is preferred as the copolymers have desirable solubility characteristics and are obtained at the preferred reaction temperatures after about two to three hours of reacting.

It is found that the copolymerization may be advantageously conducted in an atmosphere of an inert gas such as nitrogen. Therefore the reaction vessel may be purged with nitrogen before heat is applied thereto. It may be desirable from time to time to purge the reaction vessel with nitrogen as the alpha, beta-unsaturated aldehyde is added.

The copolymers of this invention are useful in the manufacture of molded articles, coatings, and the like. As the copolymers are soluble in oil, they may be used as thickening agents for motor fuels, in extreme pressure lubricants, corrosion inhibitors, and the like. Of particular value the copolymers are useful as starting materials for the preparation of other important products. Thus, for example, by hydrogenating the copolymers of alpha, beta-unsaturated aldehydes and the mono-olefin having not less than 8 carbon atoms, there are obtained resinous polyhydroxy alcohols resulting from the reduction of the aldehyde groups to hydroxy groups. The resinous polyhydric alcohols thus obtained constitute novel polymeric polyhydric alcohols for use in polyester resins.

The resinous polyhydric alcohols may be prepared by subjecting the aldehydic copolymer to catalytic hydrogenation in an inert solvent such as dioxane, but other solvents such as hexane, cyclohexane or the like may be used as desired. The amount of the solvent may vary but it is desirable that the copolymer be in a fluid state— either in solution or as a fine dispersion. Ordinarily, a solution from about 10% to 75% of copolymer is found to be convenient to handle.

The hydrogenation is conducted in the presence of a hydrogenation catalyst. Preferably, nickel catalysts such as Raney nickel are preferred. Other hydrogenation catalysts may contain metals such as cobalt, palladium, copper and silver. The amount of the catalyst may vary over a wide range but in general, an amount of 1 to 30% by weight of the copolymer is used although amounts from about 0.5 to 20% by weight based on the weight of the copolymer is sufficient.

The hydrogenation is conducted at temperatures ranging from about 50° C. to about 300° C. but it is preferred that temperatures not in excess of 250° C. be used. Hydrogen pressures of about 250 p.s.i. are effective but higher pressures, that is, in the order of about 500 to 3000 p.s.i. are generally preferred. The hydrogenation may be conducted in any suitable manner and in any type of apparatus customarily employed for hydrogenation processes.

The resinous polyhydric alcohols are found to be extremely useful products. They may be blended with urea-formaldehyde or melamine-formaldehyde resins and then subjecting the mixture to baking as in surface coating films for protective purposes. Synthetic drying oils may be obtained by esterifying the resinous polyhydric alcohol with unsaturated fatty acids such as are obtained from soybean oil, dehydrated castor oil, linseed oil, and the like.

Other valuable products may be obtained by treating the aldehydic copolymer. By oxidizing there is obtained resinous polycarboxylic acids which may be esterified with alcohols to produce resinous esters.

The following examples will illustrate the various embodiments of this invention but is will be understood that the examples are merely for purposes of illustration and are not intended to be limitations to the appended claims.

*Example I*

To a closed reaction vessel equipped with an agitator, thermometer, heating and cooling means, and inlets and outlets, is charged 565 grams of octene-1. The reaction vessel is then flushed with nitrogen to replace the air. This procedure is repeated three times. Heat is then applied to the reaction vessel and with constant agitation 120 grams of acroelin, containing 12 grams of ditertiary butyl peroxide, is added continuously to the reaction vessel and its contents at 120° C. over a period of three hours. The acrolein is stabilized with .005% of hydroquinone. After all the acrolein is added, an additional 30 minutes of agitation is continued at the same temperature. About 70 grams of a yellow solid which is waxlike in consistency forms. The supernatant liquid is distilled at a kettle temperature of 119° C. at 2 mm. Hg to yield 45 grams of the acrolein-octene-1 copolymer. It is brittle, amber in color, soluble in mineral and lubricating oils, and has the following analysis: Carbon 75.4%, hydrogen 10.9%, carbonyl value .472 eq./100 g., and a molecular weight of 1065.

*Example II*

To a reaction vessel equipped as in Example I are charged 1850 grams of octadecene-1. The temperature is brought to 160° C. over a period of two and a half hours while 98 grams of acrolein (containing .005% hydroquinone) and 58.5 grams ditertiary butyl peroxide are being added continuously. After the reaction is complete the temperature of the vessel and is contents are cooled to room temperature. There is obtained a colorless slightly viscous liquid which is treated under reduced pressure at 180° C. and 1 mm. Hg to remove the unreacted monomers. The product is a viscous liquid, soluble in oil, and having the following analysis: Carbon 83.8%, hydrogen 13.2%, carbonyl value 0.038 eq./100 g., molecular weight 1258, hydroxyl value .055 eq./100 g., and water less than .05%.

*Example III*

The procedure of Example I is repeated except that methacrolein and tridecene-1 are reacted to produce a viscous resin which is soluble in oil.

*Example IV*

The procedure of Example I is repeated except that cinnamic aldehyde and decene-1 are reacted to produce an oil soluble resin.

As indicated above, the copolymers of the aldehyde and the olefin may be hydrogenated to yield the polymeric polyhydric alcohol. Typical procedures for the hydrogenation are indicated in the following examples.

*Example V*

To a conventional hydrogenation vessel are charged 120 grams of the copolymer of Example II dissolved in 15 grams of dioxane, 12 grams Raney nickel and 5 grams of powdered calcium hydroxide. The calcium hydroxide aids in the prevention of catalyst poisoning. The contents of the hydrogenation vessel are subjected to 1550 to 1900 p.s.i.g. of hydrogen at a temperature ranging from 45 to 160° C. over a several hour period. When the hydrogenation is complete, the catalyst, calcium hydroxide, and solvent are removed by filtration and distillation, respectively, the latter being accomplished at a temperature of 150° C. at 2 mm. Hg. A viscous polymerized polyhydric copolymer is obtained having the following analyses: Acidity 0.001 eq./100 g., hydroxy value 0.081 eq./100 g., molecular weight 1260, and water content less than 0.04%.

*Example VI*

The procedure of Example V is repeated except that the copolymer of Example I is hydrogenated to yield a polymeric polyhydric alcohol of acrolein and octene-1.

In a similar manner the products of the other examples may be hydrogenated to produce polymeric polyhydric alcohols which contain a number of carbonyl groups which apparently were not hydrogenated during the hydrogenation process. A very small number of carbonyl groups are present in the polymeric polyhydric alcohol as hydrogenation of all the carbonyl groups would require excessive hydrogenating conditions. This may not be merited when the particular use to which the product is directed is considered. Thus, for example, it is found that for most uses the polymeric polyhydric alcohol may contain the few carbonyl groups without adversely affecting the product.

We claim as our invention:

1. A copolymer consisting essentially of an alpha, beta-unsaturated aldehyde having up to 10 carbon atoms and a normal mono-alpha-olefin having from 12–18 carbon atoms, said copolymer having about 5 to 45 mole percent of units of the aldehyde in the polymer molecule.

2. A copolymer consisting essentially of acrolein and a normal mono-alpha-olefin having from 12 to 18 carbon atoms, said copolymer having about 5 to 45 mole percent by weight of carbonyl units of the aldehyde in the polymer molecule.

3. A copolymer consisting essentially of acrolein and octadecene-1 wherein said copolymer contains from about 5 to 45 mole percent of units of the aldehyde in the polymer molecules thereof.

References Cited in the file of this patent

UNITED STATES PATENTS

| | | |
|---|---|---|
| 2,055,456 | Eichwald | Sept. 22, 1936 |
| 2,162,616 | Herrmann et al. | June 13, 1939 |
| 2,178,523 | Schmidt et al. | Oct. 31, 1939 |
| 2,514,168 | Smith et al. | July 4, 1950 |
| 2,554,973 | Ballard et al. | May 29, 1951 |

OTHER REFERENCES

Smith et al.: Journal of American Chemical Society, vol. 73, pages 5273–80, 1951.